(12) United States Patent
Kashiwai et al.

(10) Patent No.: US 6,647,784 B2
(45) Date of Patent: Nov. 18, 2003

(54) BALANCE ADJUSTED WHEEL AND MANUFACTURING METHOD

(75) Inventors: Mikio Kashiwai, Saitama (JP); Shiro Sato, Saitama (JP); Hisamitsu Takagi, Saitama (JP); Shinichi Watanabe, Saitama (JP); Hidemi Ichinose, Saitama (JP); Yukiyasu Shiroi, Shizuoka (JP); Yoichiro Ishiguro, Shizuoka (JP); Isao Takeshita, Shizouka (JP)

(73) Assignees: Honda Giken Kogyo Kabushiki Kaisha, Tokyo (JP); Enkei Corporation, Shizuoka (JP)

( * ) Notice: Subject to any disclaimer, the term of this patent is extended or adjusted under 35 U.S.C. 154(b) by 0 days.

(21) Appl. No.: 09/997,249

(22) Filed: Nov. 30, 2001

(65) Prior Publication Data

US 2002/0066316 A1 Jun. 6, 2002

(30) Foreign Application Priority Data

Dec. 1, 2000 (JP) ........................................ 2000-366705

(51) Int. Cl.[7] ................................................ G01M 1/00
(52) U.S. Cl. ......................................... 73/458; 73/461
(58) Field of Search ........................ 73/458, 460, 462, 73/468, 486, 487, 461, 480

(56) References Cited

FOREIGN PATENT DOCUMENTS

| JP | 62-9850 | * | 1/1987 |
| JP | 2000-153441 | * | 6/2000 |
| JP | 63-031801 | | 5/2003 |

* cited by examiner

*Primary Examiner*—Helen Kwok
(74) *Attorney, Agent, or Firm*—Arent Fox Kintner Plotkin & Kahn, PLLC

(57) ABSTRACT

The object of the invention is to provide a balance adjusted wheel and its manufacturing method utilizing a cutting surface, for which cutting is performed by setting a point as a rotation center offset by a given distance from the central axis of a wheel central portion. The invention will improve the work efficiency for wheel balance adjustment and manufacturing of tire/wheel assembly.

4 Claims, 7 Drawing Sheets

(a)

(b)

(a)

| CHUCK POSITION | STATIC UNBALANCE | |
|---|---|---|
| | AVERAGE (g) | DISTRIBUTION RANGE (DEG) |
| 1 | 21.2 | 70 |
| 2 | 25.8 | 50 |
| 3 | 27.2 | 27 |
| 4 | 26.2 | 45 |
| 5 | 14.3 | 56 |
| 6 | 7.2 | 175 |

(b)

BALANCE ADJUSTED WHEEL AND MANUFACTURING METHOD

FIELD OF THE INVENTION

The present invention relates to a wheel, on which a tire is mounted and used for vehicles such as an automobile etc., and its manufacturing method, and particularly relates to the adjustment of wheel weight balance.

BACKGROUND OF THE INVENTION

A tire/wheel assembly, which is used for vehicles such as an automobile etc., includes a wheel and a tire that is assembled onto it. The wheel has an approximately cylindrical rim portion (rim), on which a tire is mounted, and a disk portion (disk), which is fixed to the hub of a vehicle driving axle with bolts etc. Further, an air valve is installed on the rim, which is for pumping compressed air into the tire.

Wheels are generally divided into a steel type and a light metal alloy type such as aluminum alloy etc., and the wheel made of light metal alloy has an advantage that the lightweight tire/wheel assembly can be achieved.

In this type of wheel made of light metal alloy (hereinafter referred to as wheel), drawing is given to the raw product manufactured by forging or casting to form the disk portion and rim portion, and the dimensional refinement is performed by cutting. Cutting has been performed with a center hole as central axis, to which the hub of a vehicle axle is fixed. This is for aligning the central axis of the wheel with the vehicle axle so that the vertical vibration during the vehicle running may be prevented.

An adjustment of shape and weight balance is performed for the tire/wheel assembly during the assembly to achieve the running stability of the vehicle. After the tire/wheel assembly is completed, having the maximum point of the tire strength (RFV point) meet the minimum point of the wheel radius (RRO point), balance weights such as lead etc. are attached on the wheel rim portion as required by checking the balance with unbalance measurement equipment. The amount and position of balance weight have been determined by measuring the unbalance amount and its distribution with a balancer.

However, the wheel above mentioned includes the heavy point position and the unbalance amount, which vary from one wheel to another due to the machining tolerance of cutting, in addition to the weight unbalance of the raw product itself. In this connection, the machining tolerance stems from the offset between the rotation axis of a chuck and the central axis of the wheel raw product, which is attributed to the chuck performance of the cutting machine and is difficult to cancel out to null. Therefore, the balance measurement and the calculation of the balance weight and its mounting position have been necessary for each tire/wheel assembly in the tire/wheel assembly process, resulting in a cause to hinder the improvement of the assembly work efficiency.

SUMMARY OF THE INVENTION

It is therefore an object of the present invention to provide a balance adjusted wheel and its manufacturing method, which enable the improvement of work efficiency of the whole process from the wheel manufacturing through the completion of tire/wheel assembly, by adjusting the position of the heavy point in terms of the static weight distribution during the wheel manufacturing process to improve the efficiency of the balance adjustment of tire/wheel assembly.

According to an embodiment of the present invention, there is provided a manufacturing method of balance adjusted wheel, which is a manufacturing method of wheel with a cutting surface, wherein cutting performed by setting the point as a rotation center offset from the central axis of a wheel central portion, which is for aligning the wheel with the central axis of a vehicle axle.

According to an embodiment of the present invention, there is provided a balance-adjusted wheel, wherein at least one of rotation centers of the cutting surface is offset from the central axis of the wheel central portion, which is for aligning the wheel with the central axis of the vehicle axle.

Cutting the wheel by setting a point offset from the central axis of the wheel central portion as a rotation center will easily form the cut surface with eccentricity. The wheel thus manufactured has the portion of large wall thickness, the portion of small wall thickness or the portion where the center of gravity is located offset from the central axis of the wheel central portion, as a result of the wheel having such a cut surface. Therefore, the weight balance as a whole wheel will vary in the known offset direction, which can be utilized for the balance adjustment of the wheel.

The wheel thus manufactured makes the heavy point position and unbalance amount known in advance and is able to reduce the dispersion in them, enabling an efficient balance adjustment work in the manufacturing of the tire/wheel assembly. If the air valve mounting hole that is for mounting the valve to pump up a tire is placed on the line, which is defined by the heavy point thus formed and the center hole, it will be easier to check the heavy point.

DESCRIPTION OF THE PREFERRED EMBODIMENTS

To describe the present invention more in detail, a preferred embodiment will be described below in detail with reference to the drawings.

Figure 1:
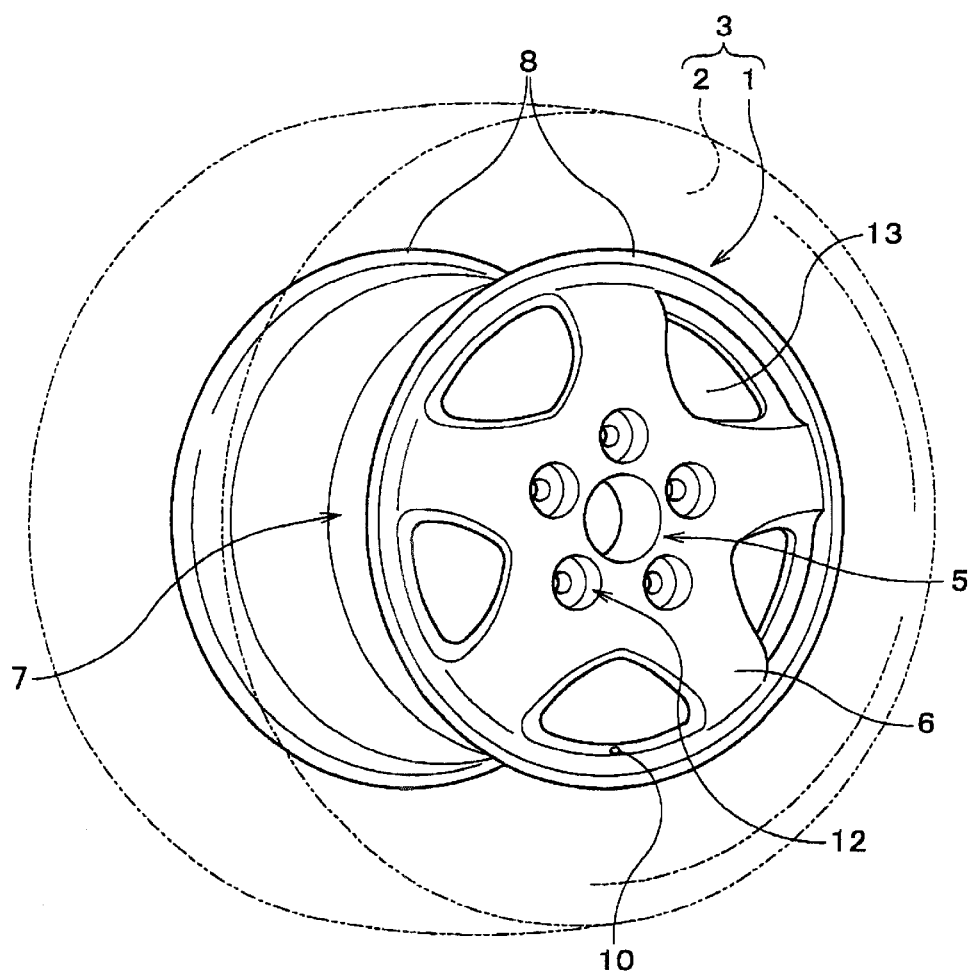
FIG. 1 is a perspective view showing a tire/wheel assembly with the balance adjusted wheel according to the preferred embodiment of the invention.
Figure 2:
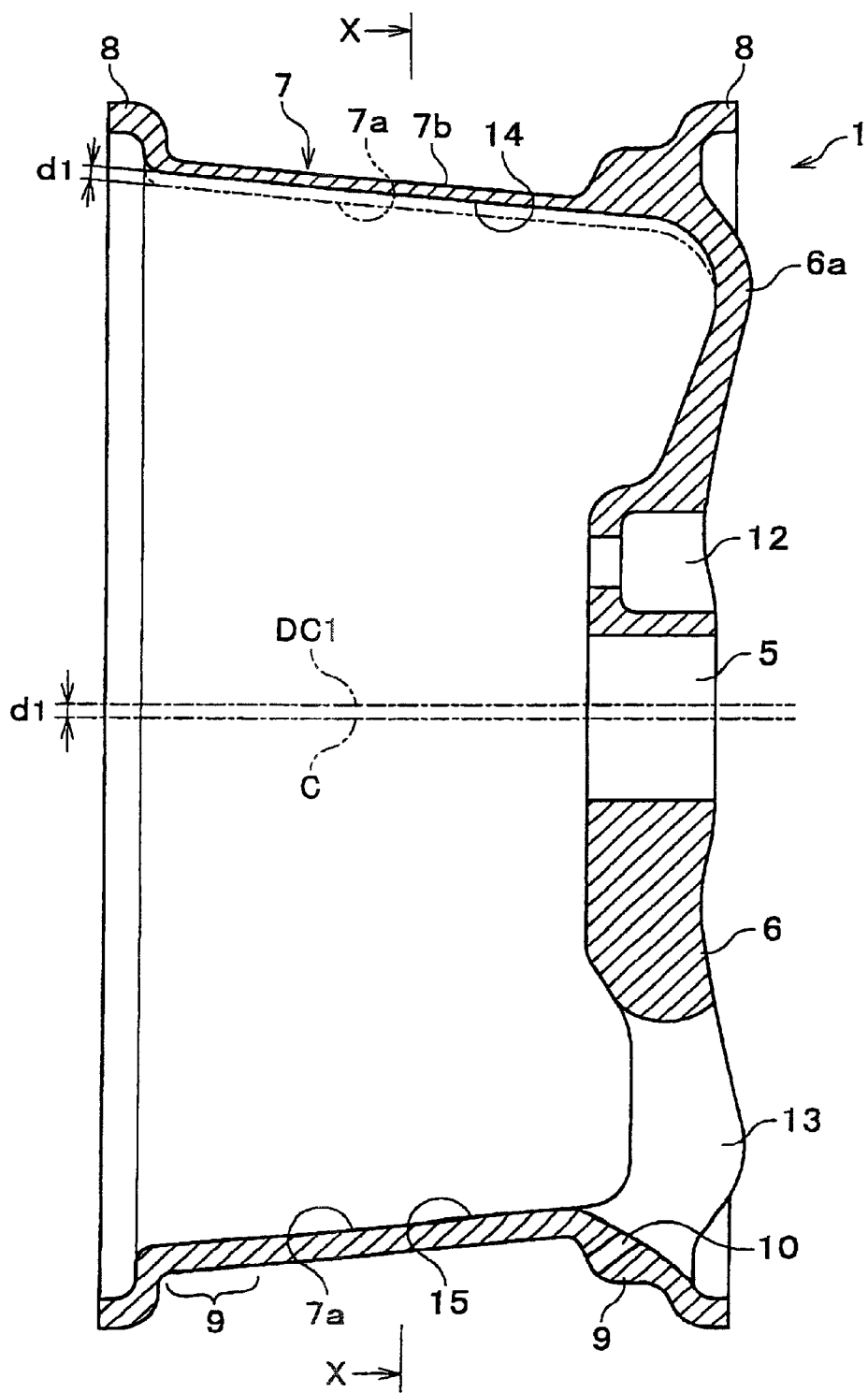
FIG. 2 is a cross sectional view showing the side of wheel shown in FIG. 1.

As shown in FIG. 1 and FIG. 2, a wheel made of light metal alloy 1 (hereinafter referred to as a wheel 1) is mounted with a tire 2 to form a tire/wheel assembly 3, which is fixed to the hub of a vehicle axle for use.

The wheel 1 is made of light metal alloy such as aluminum alloy etc., which has a disk portion 6 of a disk-like plate that has a center hole 5, the center for fixing the wheel to the hub, and a rim portion 7 with an approximately cylindrical shape for mounting the tire 2. Though in the illustrated embodiment of the present invention the wheel 1 has been described as a wheel of one piece manufactured of light metal alloy, the disk portion 6 and the rim portion 7 may be separate (2 pieces), or 3-piece type may also be an alternative. Further, the wheel 1 can be made of stainless steel.

The rim portion 7 is configured approximately like a cylinder, which has an inner circumferential surface 7a and an outer circumferential surface 7b. Both edges of the outer circumferential surface 7b are elevated to form rim flanges 8. The tire 2 is mounted on the wheel 1 by mating the bead of the tire 2 to the rim flange 8 and a bead sheet 9 inside the rim flange 8, thereby manufacturing the tire/wheel assembly 3. Further, a mounting hole 10 for the air valve, which is prepared for pumping the compressed air into the tire 2, is provided on the disk 6 side of the rim 7.

Figure 3:
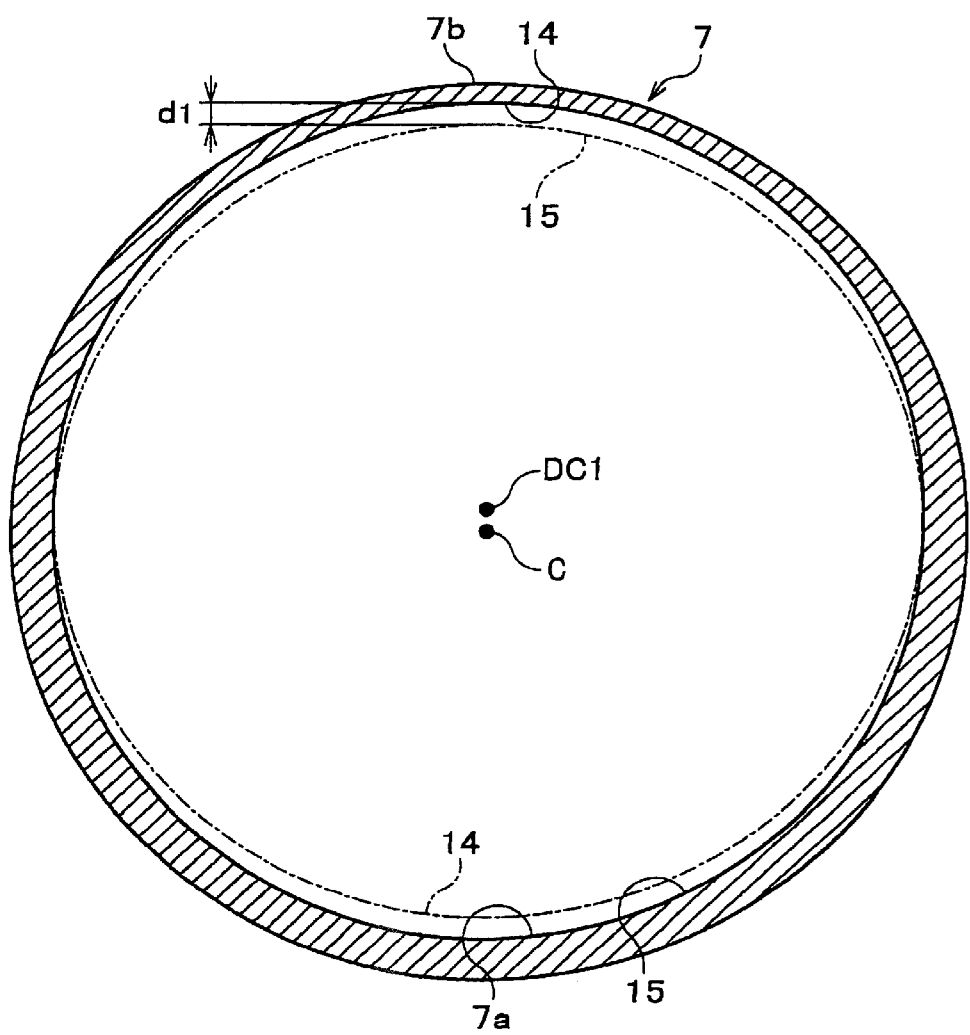
FIG. 3 is an X—X arrow view of the wheel shown in FIG. 2.

As shown in FIG. 2 and FIG. 3, the upper side of the inner circumferential surface 7a is an eccentric machining surface 14, the rotation center of which is located at DC1 offset from the central axis by the distance of d1. On the other hand, the lower side of the circumferential surface 7a is a non-eccentric machining surface 15, the rotation center of which is located at the central axis of the wheel 1. Therefore, because the wall thickness of the upper side is smaller than that of the lower side by the thickness of d1, the weight of lower side of rim 7 is relatively bigger. The eccentric machining surface 14 refers to a cut surface, at least one of rotation centers of which is offset from the central axis of the wheel central portion according to the appended claim. The manufacturing method of the eccentric machining surface 14 will be described later.

Inserting holes 12 are provided near the center hole 5 of the disk 6, through which the bolts of the hub are inserted and fastened with nuts. A plurality of cutouts 13 is provided at a peripheral location 6a of the disk 6 around the center hole 5. The cutouts 13 are provided as cooling hole for releasing the frictional heat generated by the disk brake placed near the hub and taking in the air for cooling, or as decorative hole.

The wheel 1 is manufactured by adding the cutting process etc. to the raw product to perform the dimensional refinement, which has been formed to be close to the final configuration of the disk 6 and rim 7 by casting, forging or drawing.

Figure 4:
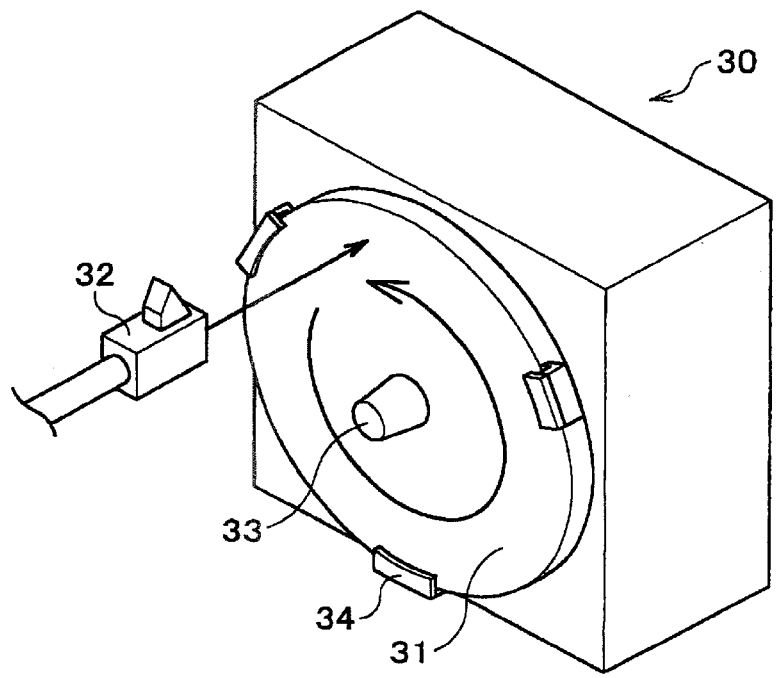
FIG. 4 (a) is a perspective view showing the machine for cutting a raw product and FIG. 4 (b) is a partially enlarged cross sectional view showing the side of the machine
Figure 4:
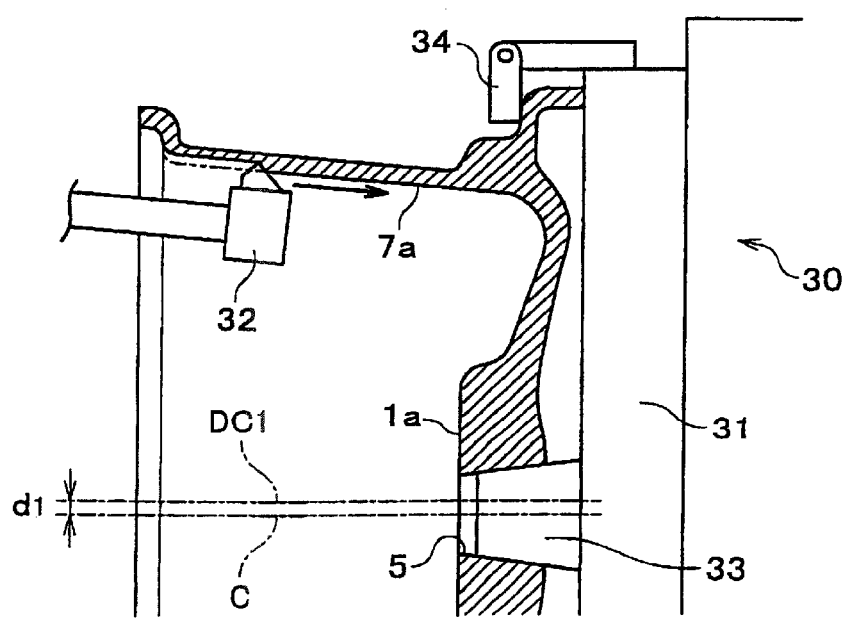

In the cutting process to perform the dimensional refinement of the wheel 1, a raw product 1a is fixed to the chuck 31 of a machine 30 shown in FIGS. 4(a) and 4(b) and the raw product 1a is rotated with the chuck 31 as one body. Cutting is performed by contacting a machining tool 32 equipped with a given cutting bite against the raw product 1a, and by operating the machining tool 32 along the inner circumferential surface 7a of the rim 7 with a given feeding. The chuck 31 has a taper cone 33 mating to the center hole 5 of the raw product 1a, and three holders 34 on the circumference to fix the rim flange 8 of the raw product 1a. It is anticipated that optional types of chuck such as a stroke-type or collet chuck, etc. may be used instead of the chuck 31, not limited to the shape shown in FIG. 4(a). A lateral-type machine may also be used instead of the machine 30.

According to the embodiment of the invention, the position of the taper cone 33 is offset so that the central axis C of the raw product 1a is located below the rotational center DC1 of the chuck 31 by the distance of d1 shown in FIG. 4(b). The center hole 5 of the raw product 1a is mated to the taper cone 33 and the rim flange 8 of the raw product 1a is fixed with the three holders 34. Cutting is performed for the raw product 1a rotating the chuck 31 around the central axis DC1, forming the eccentric machining surface 14 for the rim 7, the rotational center of which is located at the central axis DC1 offset from the central axis C of the raw material 1a.

The raw product is fixed so that its central axis C is offset from the central axis DC1 of the chuck 31, creating the remote and close portions from the central axis DC1 of the chuck 31 on the inner circumferential surface 7a of the rim 7. When the machining tool 32 is fed against the inner circumferential surface 7a of the rim 7 with rotating the chuck 31, the portion of the inner circumferential surface 7a close to the central axis DC1 of the chuck 31 is cut to form the eccentric machining surface 14, as the bite of the machining tool 32 touches the inner circumferential surface 7a. On the other hand, the portion remote from the central axis DC1 of the chuck 31 is not cut, as the bite of the machining tool 32 does not reach the inner circumferential surface 7a. The eccentric machining surface 14 cut on the inner circumferential surface 7a with the machining tool 32, and the non-eccentric surface 15, which is not cut during the eccentric machining, are formed in the same plane perpendicular to the central axis C (see FIG. 3).

Casting, forging and drawing are performed for the rim flange 8 on the outer circumferential surface 7b of rim 7, the bead sheet 9 and the center hole 5, setting the central axis C as a rotation axis. This is for preventing the occurrence of vibration caused by the offset between the vehicle axle and the tire 2.

The wheel 1 thus manufactured for the dimensional refinement has the portion, in which the wall is thinner by the distance d1 between the central axis C and another central axis DC1, by creating the eccentric machining surface 14. Specifically, because the thickness of the upper portion of the rim 7 shown in FIG. 2 is smaller by d1, the weight balance of the wheel 1 is lost in the vertical direction shown in FIG. 2, shifting the heavy point of the wheel 1 downward to the heavier portion. Even if the difference in weight occurs in other directions between the opposite points with regard to the central axis C, the resulting heavy point as a whole will fall in the lower portion of the wheel 1, since the weight difference in the vertical direction is dominant.

As a matter of illustrative convenience it has been described that the cutting amount (thickness) is the same as the distance between the central axes C and DC1. However, the cutting thickness may be larger or smaller than d1. When the cutting thickness is larger than the distance between the central axes C and DC1, all the area of the inner circumferential surface 7a of the rim 7 will be cut to form the machining surface 14 shown in FIG. 3. The upper portion of the rim 7 shown in FIG. 3 is cut more to be thinner because it is close to the central axis DC1. On the other hand, the lower portion of rim 7 is cut less to be thicker because it is remote from the central axis DC1. Therefore, the lower portion of the wheel 1 is relatively heavier, shifting the heavy point downward.

Figure 5:
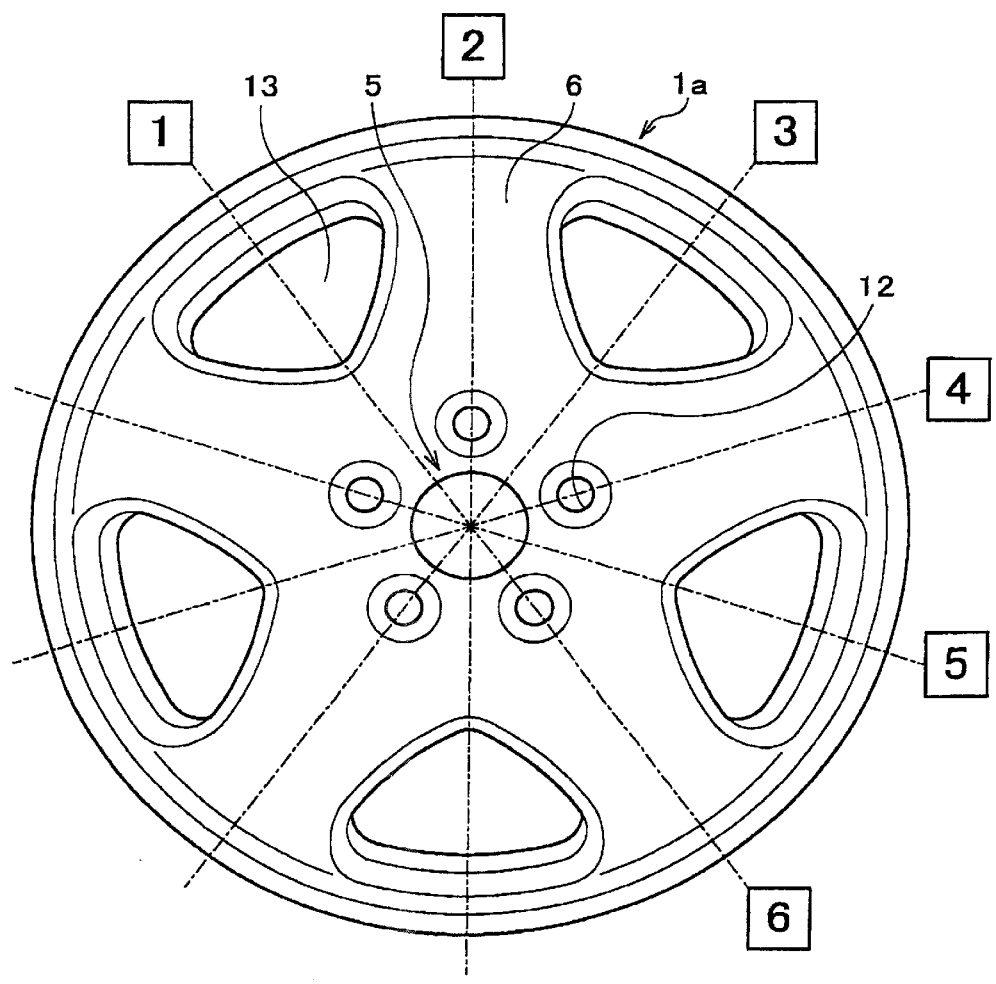
FIG. 5 is a front view of the wheel shown in FIG. 1.

An experiment was performed on the adjustment of heavy point of the wheel 1 with the chuck position. The raw product 1a shown in FIG. 5 was radially divided into the 10 equal portions and chucked to the machine 30 in a manner that the points with the numerals 1 through 6 on the alternate long and short dash lines came downward. The offset was 0.05–0.1 mm and the cutting thickness with the machining tool 32 was 0.5–1.0 mm. Therefore, cutting was performed for all the inner circumferential surface 7a of the rim 7. The heavy point of the raw product 1a before the cutting process was on the position 3.

The unbalance amount and its distribution measured after the cutting process of the wheel 1 are shown in FIG. 6(a) and FIG. 6(b). The unbalance amount shown in FIG. 6(a) and FIG. 6(b) is the average of measurements at 8 points.

Figure 6:
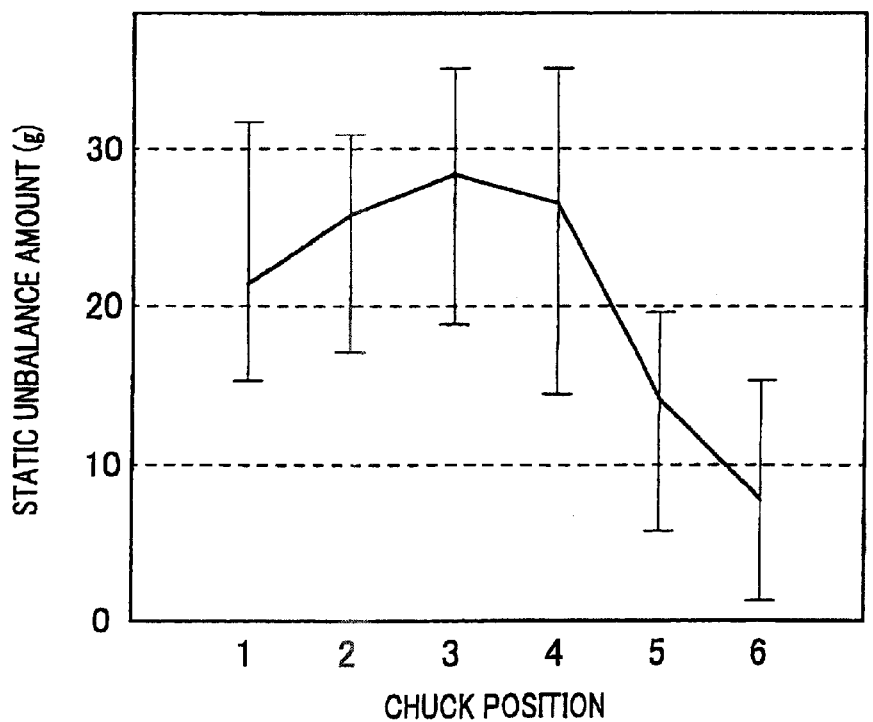
FIG. 6 (a) is a figure showing the unbalance amount and the range of its distribution and the FIG. 6 (b) is a figure showing the unbalance amount for each chuck point.

As shown in FIG. 6 (a), the chuck position, in which the unbalance amount was the largest and the range of unbalance distribution was the smallest, fell in position 3. It met the position of heavy point before the cutting process, which may have been attributed to the fact that the heavy point of the raw product 1a itself was distinguished by the eccentric machining. Positions 2 and 4 had large unbalance amount, though not so large as position 3, and the range of unbalance distribution was also relatively small. It will lead to mention that the offset direction of the central axis C of the raw product 1a at the cutting process should meet the direction of the heavy point originally possessed by the raw product 1a, or cross it within the crossing angle of 40 degrees.

Though the distance d1 differs with the total weight and size of the wheel 1, it would be preferably as much as 0.05–0.1 mm when the thickness of the rim 7 is approximately 4.5 mm. It will be possible to perform the balance adjustment of the wheel without the restriction of the direction of the heavy point of the raw product 1a before the cutting process if the distance d1 is increased.

It will be possible to locate the heavy point and identify the unbalance amount in advance for the wheel 1 manufactured this way and further to reduce the dispersion of the heavy point position and the unbalance amount for each wheel 1. Especially, because the adjustment of the heavy point of the wheel 1 can be performed during the cutting process for the dimensional refinement of the wheel 1, the efficiency of the assembly process of the wheel 1 manufacturing through the completion of tire/wheel assembly 3 will be improved. Providing the air valve mounting hole 10 in the direction of the heavy point of the wheel 1, the check of the heavy point of the wheel 1 will be easier. Also when the air valve is mounted therein, the weight of the air valve will be added, leading to the reduction in the dispersion of the heavy point of the whole wheel 1 with the air valve.

The process of the balance adjustment of the tire/wheel assembly 3 is described below when the tire 2 is mounted on the wheel 1 to manufacture the tire/wheel assembly 3.

For example, when neither the wheel 1 nor the tire 2 has the dispersion in the circumferential direction, the unbalance of the wheel 1 and the unbalance of the tire 2 will be cancelled out each other only if the position of the air valve mounting hole 10 is located in the light point of the tire 2.

When the wheel 1 has the small radius point (RRO point) and the tire 2 has the thick point (RFV point), the required weight and position for the balance adjustment will be easily determined even if the static balance of the whole tire/wheel assembly 3 is not kept by mating the RRO point and the RFV point, since the heavy point and the unbalance amount of the wheel are known, thus improving the efficiency of the balance adjustment in the process of the tire/wheel assembly 3.

Figure 7:
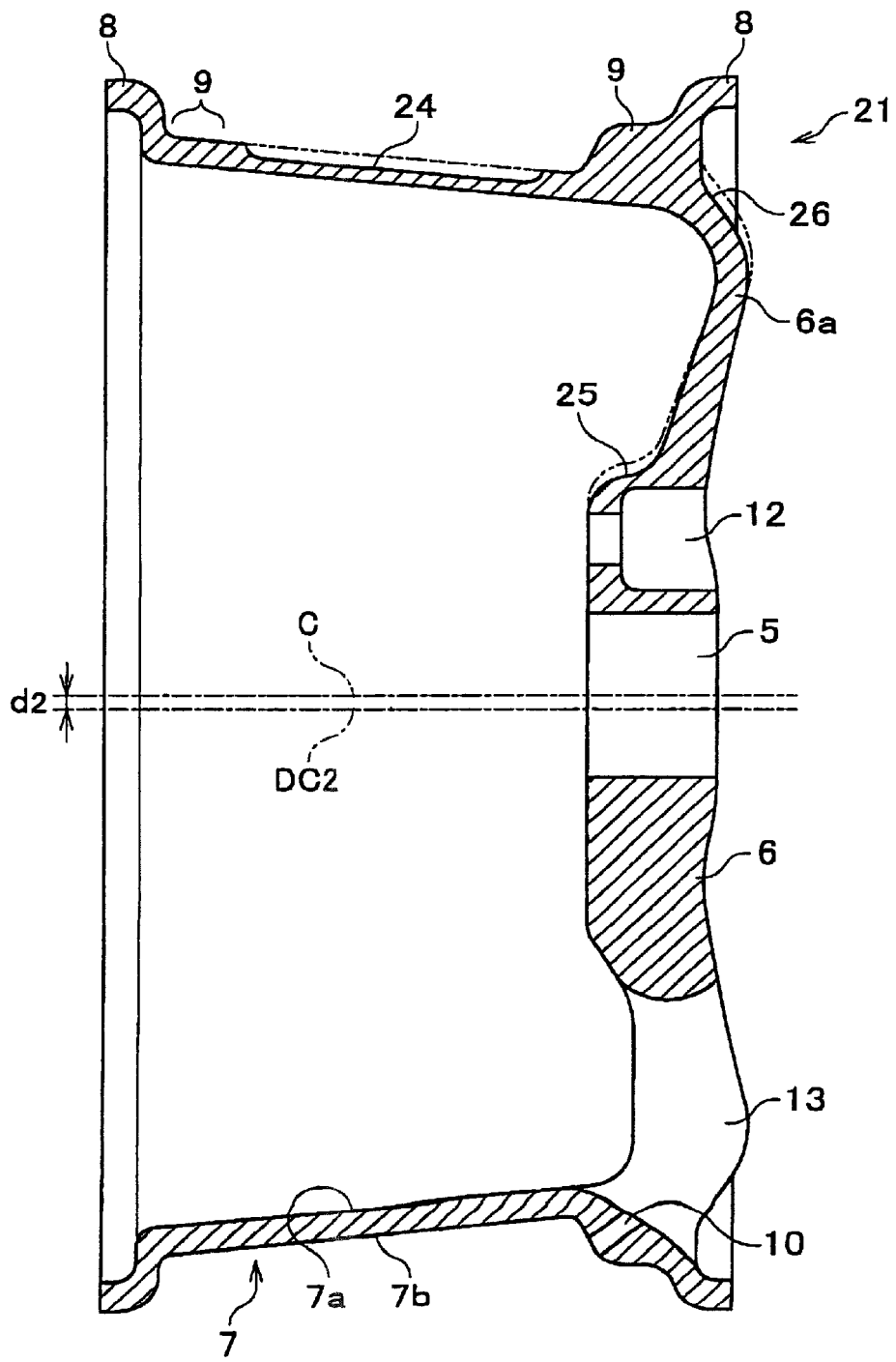
FIG. 7 is a cross sectional view showing the side of balance adjusted wheel according to another preferred embodiment of the invention.

Instead of providing the eccentric machining surface 14 on the inner circumferential surface 7a of the rim 7, the wheel 21 may be an alternative, in which an eccentric machining surface 24 is provided on the outer circumferential surface 7b of the rim 7 shown in FIG. 7. In this case, it would be preferable to cut only the middle part of the outer circumferential surface 7b of the rim 7 to form the eccentric machining surface 24. The reason for it is that the rotation centers of the rim flange 8 and the bead sheet 9 have to be aligned with the central axis C of the wheel 1 because the rim flange 8 and the bead sheet 9 next to it govern the mounting position of the tire 2. This wheel 21 can be manufactured by cutting the middle part of the outer circumferential surface 7b of the rim 7 with the central axis DC2 as a rotation center, which is located a given distance d2 below the central axis C. The heavy point of the wheel 1 will come downward, located in the side of the air valve mounting hole 10 since the upper portion of the rim 7 is relatively lighter than the lower portion as a result of the cutting process.

As shown in FIG. 7, when an eccentric machining surface 25 is formed in the central portion of the disk 6 or an eccentric machining surface 26 is formed on a circumferential surface of the disk 6, it is possible to achieve the similar effect as the case of the eccentric machining surface 24 formed on the rim 7.

Further, it is possible to control the position of the heavy point with the combination of these eccentric surfaces 14, 24, 25 and 26 as required. Because the amount of cutting is small for the eccentric machining surfaces 14, 24, 25 and 26, the appearance will not be affected by providing these surfaces.

Though the case where the side of the central axis DC1 is relatively lighter, seeing from the central axis C, has been described so far, the opposite case where it is relatively heavier will also be possible.

This is the case shown in FIG. 3 where cutting is performed for the outer circumferential surface 7b with the central axis DC1 as a rotation axis in addition to forming the eccentric surface 14 throughout the inner circumferential surface 7a of the rim 7. Though the shape of the rim 7 depends on the amount of cutting, the side of the central axis DC1 of the wheel 1 as a whole can be heavier since the rim 7 as a whole after cutting is offset toward the central axis DC1. For example, when a well (deep bottom) is formed on the rim 7, it is possible to adjust the heavy point by offsetting the well from the central axis C of the wheel 1.

It will now be appreciated from the foregoing description that the present invention is not limited to the particular illustrated embodiment discussed above and may be carried out in various modified forms. For example, the eccentric surfaces 14, 24, 25 and 26 may be formed without the rotation of the raw product 1a, with introduction of a machining tool 32 instead, which has a mechanism to rotate a bite. In this case, the eccentric surfaces 14, 24, 25 and 26 will be easily formed with the numerical control of the position of the machining tool 32 and the amount of cutting. Especially, the present case allows a straight cutting for the portion of the inner circumferential surface 7a of rim 7, enabling a fine adjustment of the unbalance amount of the wheel 1. It is assumed here that the rotational center axes of the eccentric machining surface 14, 24,25 and 26 thus formed are equivalent with the point at infinity.

It is possible to cancel out the unbalance amount of the wheel 1 with the air valve weight if the air valve mounting hole 10 is placed so that it diagonally faces the heavy point interposing the center axis of the wheel 1 between them. The air valve mounting hole 10 may also be provided so as to make a given angle with the heavy point and the central axis C, which will adjust the heavy point position and unbalance amount of the wheel 1.

What is claimed is:

1. A method of manufacturing a balance adjusted wheel, said method comprising a step of:

cutting said wheel by setting a point as a rotation center for cutting, offset from a central axis of a central portion of the wheel for aligning said wheel with a central axis of a vehicle axle.

2. A balance adjusted wheel, wherein at least one of rotation centers of a cut surface is offset from a central axis of a central portion of the wheel for aligning said wheel with a central axis of a vehicle axle.

3. A balance adjusted wheel according to claim 2, wherein said cut surface is provided on at least one of an outer circumferential surface of a rim portion, an inner circumferential surface of a rim portion, a central portion of a disk portion, and an outer circumferential surface of a disk portion, and a weight and position of a balance weight are determined with a heavy point position and unbalanced amount which are made known in advance with said cut surface if a balance weight is necessary.

4. A balance adjusted wheel according to claim 2, wherein a weight balance of said wheel varies in a direction of said offset as said wheel has a thicker portion, a thinner portion and a portion having a center of gravity offset from said central axis of central portion of the wheel, and an unbalanced amount of said wheel and an unbalanced amount of a tire can be cancelled by assembling said wheel and tire so that said thicker portion meets a light position of said tire.

* * * * *